United States Patent [19]

Ellinger

[11] 4,031,962
[45] June 28, 1977

[54] FARM IMPLEMENT POSITIONER

[75] Inventor: Earl H. Ellinger, Crookston, Minn.

[73] Assignee: Dee, Inc., Crookston, Minn.

[22] Filed: Oct. 14, 1975

[21] Appl. No.: 621,804

[52] U.S. Cl. .................................. 171/8; 180/79.1
[51] Int. Cl.² ....................................... A01D 33/00
[58] Field of Search .............. 171/8, 61, 58; 172/4; 180/79.2

[56] References Cited

UNITED STATES PATENTS

| 3,038,544 | 6/1962 | Richey et al. | 171/8 X |
| 3,183,976 | 5/1965 | Rollins | 171/8 |
| 3,326,319 | 6/1967 | Schmidt | 180/79.2 |
| 3,844,357 | 10/1974 | Ellinger | 172/4 |

Primary Examiner—Russell R. Kinsey
Attorney, Agent, or Firm—H. Dale Palmatier

[57] ABSTRACT

A positioner for automatically positioning a farm implement, such as a sugar beet harvester, in line with rows of crops such as sugar beets and for automatically maintaining the height of the implement relative to the ground surface. The positioner includes a harness pivotal about an upright axis, and a pair of crop and ground level sensing shoes mounted to the harness pivotally to permit the trailing ends of the shoes to swing vertically and horizontally. Hydraulic controls respond to swinging of the shoes vertically (as when the height of the implement varies) and horizontally (as when the implement strays toward one side or the other of a crop row) and return the implement to its correct vertical and side-to-side alignment with the crop row.

6 Claims, 7 Drawing Figures

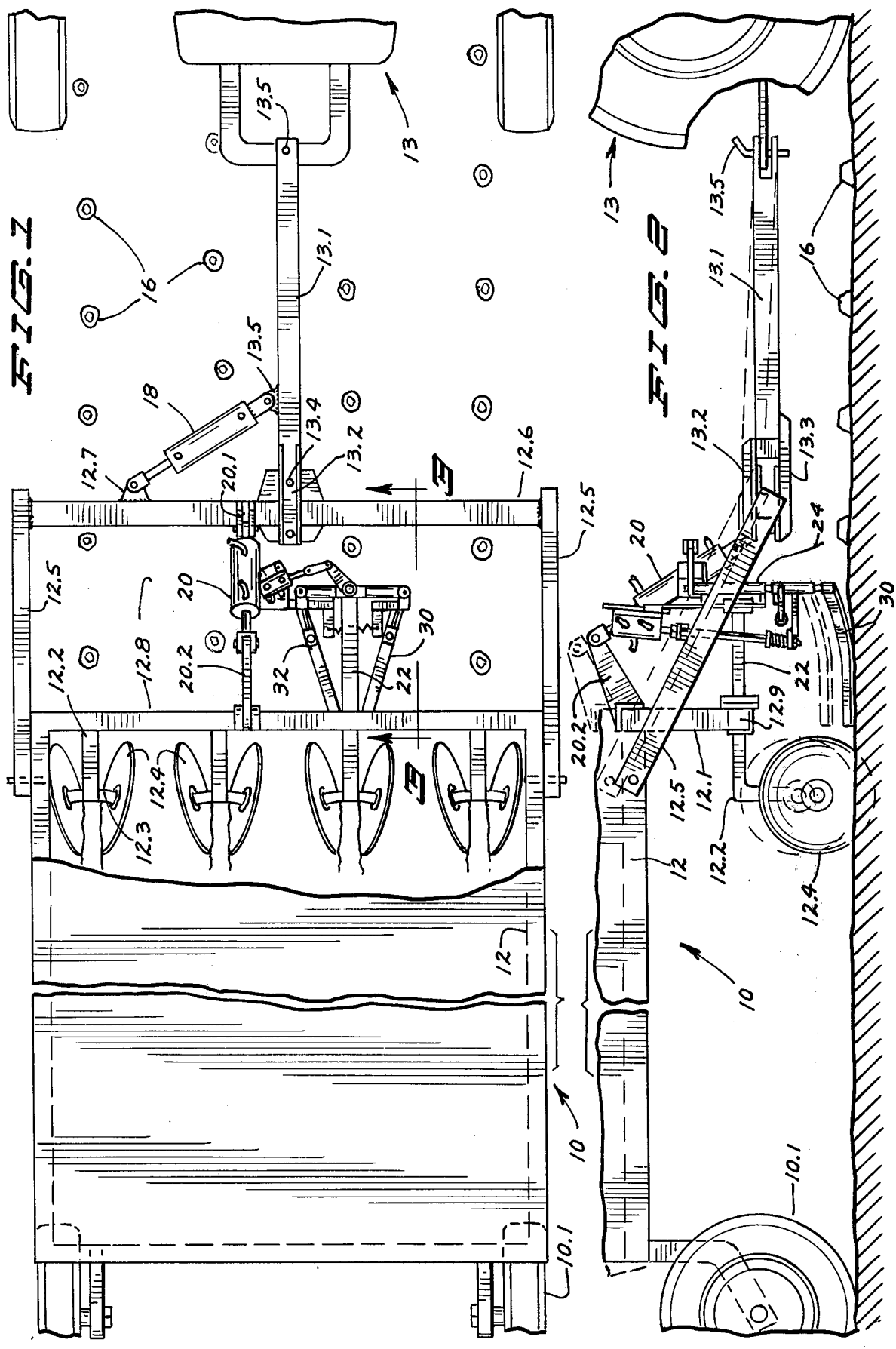

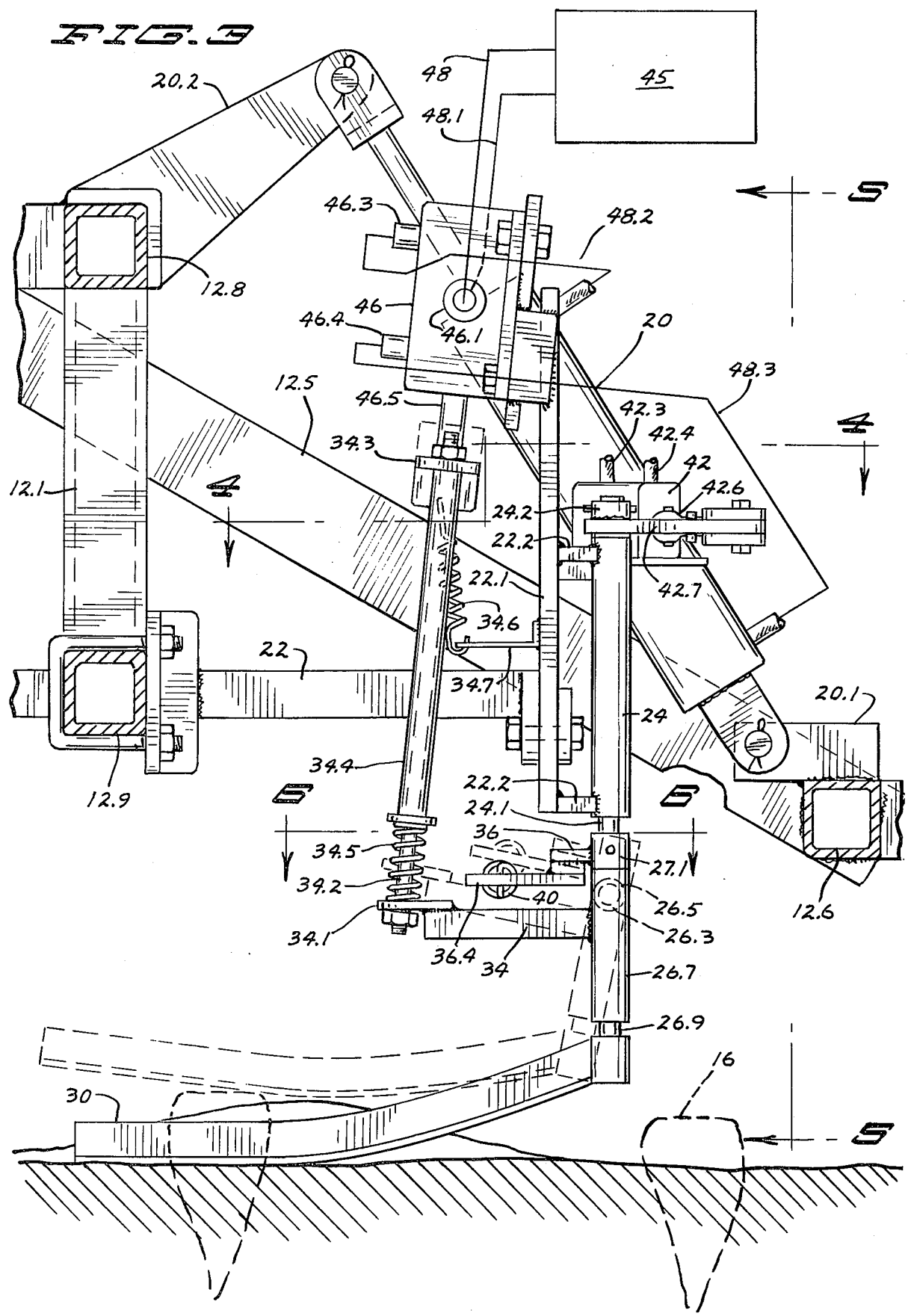

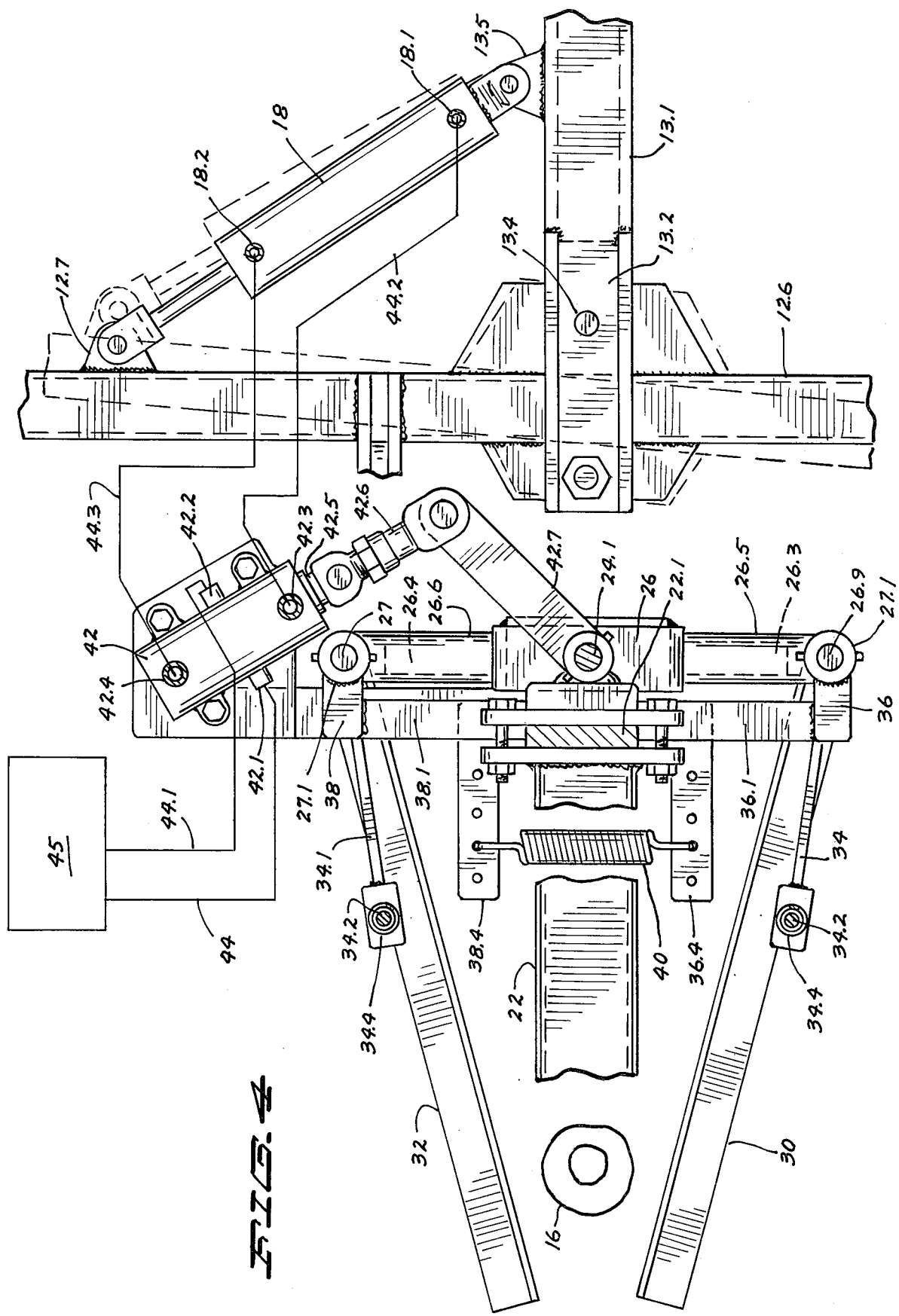

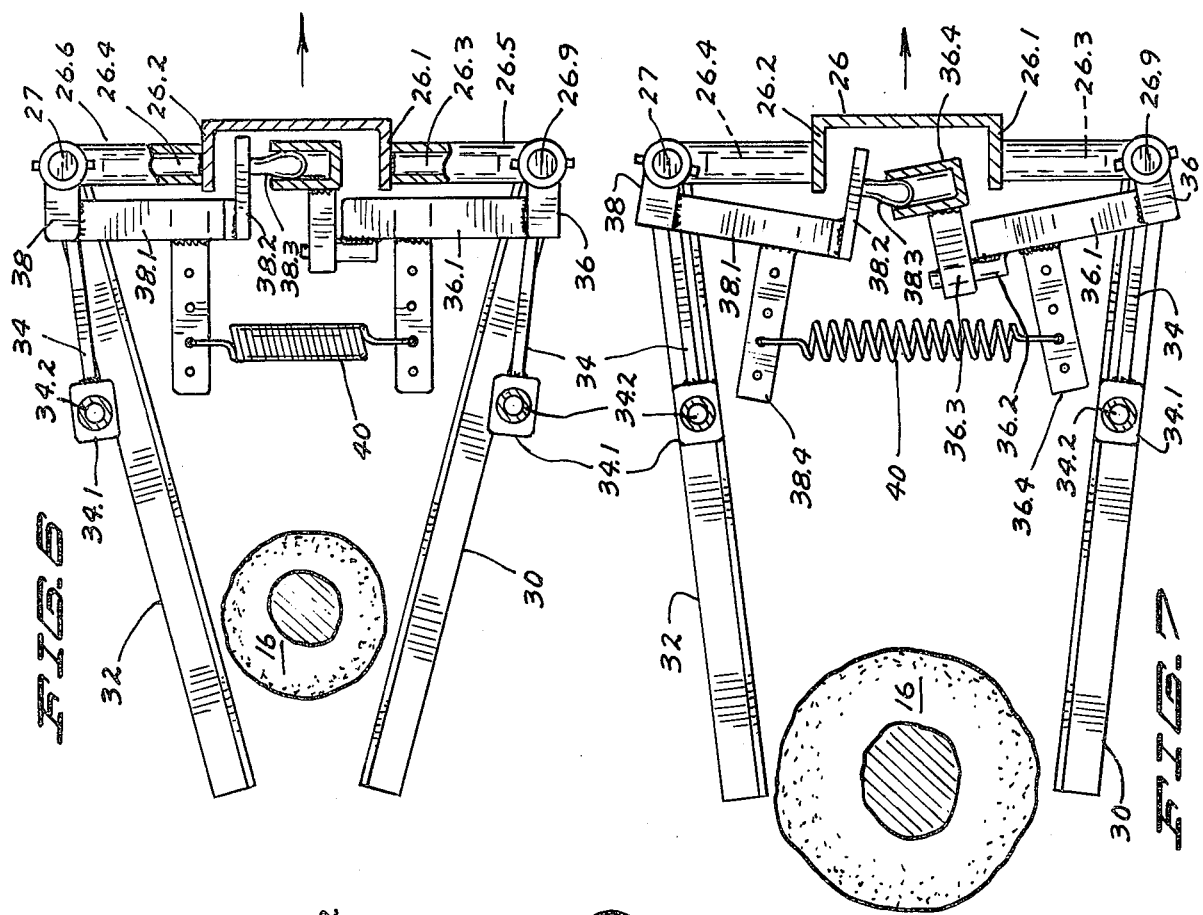
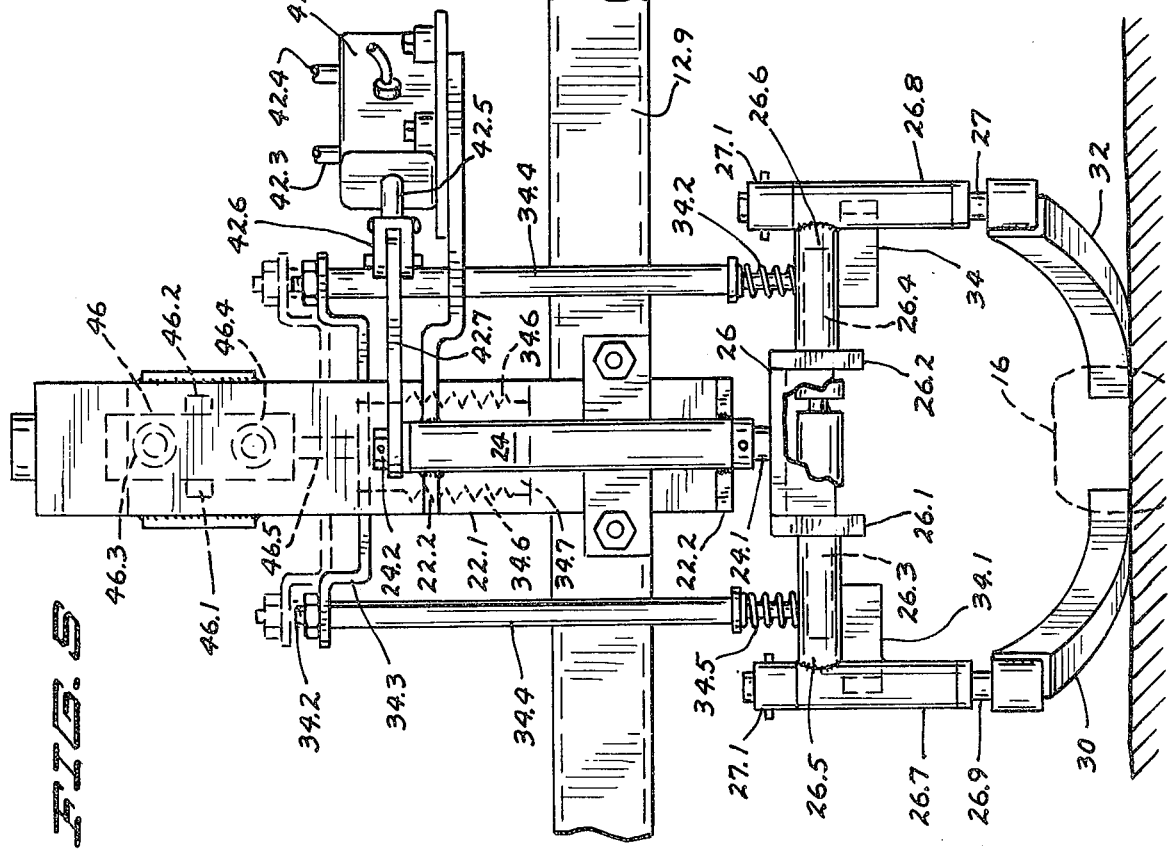

FARM IMPLEMENT POSITIONER

BACKGROUND OF THE INVENTION

In the cultivating or harvesting of crops, such as sugar beets, a tractor is ordinarily employed to pull a farm implement such as a beet harvester along the crop rows. In beet harvesting, rather precise, continuous alignment of the harvester with the rows of beets is required. It is extremely difficult to so steer the tractor as to maintain this precise alignment, as continuous, careful attention must be given by the tractor operator to the position of the tractor and harvester with respect to the rows of beets. As modern harvesters move through the fields at several miles per hour, even a momentary misalignment of the harvester may cause may beets to be missed.

Numerous efforts have been made to provide apparatus for sensing misalignment of a farm implement with a crop row and for shifting the farm implement back into alignment. Representative of such devices are those described in U.S. Pat. Nos. 3,461,967; 3,326,319 and 3,183,976. Such devices include a pair of row-sensing shoes which operate a hydraulic system to shift the trailing farm implement from one side to another Devices of this type, however, do not take into consideration variances in the size of the plants (such as sugar beets), often are slow acting, and may not be accurate in aligning the farm implement with the plants whose position is sensed.

Moreover, problems have also been encountered particularly with cultivating and beet harvesting equipment, in digging too deeply for the beets or in passing over and missing the beets entirely as the implement moves along a crop row. This in turn may be caused by rolling land contours, soft or muddy spots in the field in which the tractor and implement tires partially sink, etc. Various devices have been proposed for automatically maintaining the level of a farm implement such as a cultivator with respect to the ground, and among such devices may be listed that of my U.S. Pat. No. 3,844,357. The height-sensing devices, however, do not take into consideration side-to-side variances in the alignment of a harvester with a crop row, nor do such devices account for dips or soft spots row which may be encountered by the tractor or implement tires. That is, such devices ordinarily react only to the level of a single ground level-sensing shoe or foot.

As a result, farmers must exercise extreme care is maintaining the precise position of the tractor with repsect to a crop row, and are often simply unable to insure that substantially all of the plants in the crop row will be properly cultivated or harvested or the like. Since modern agricultural methods stress speed of cultivation and harvesting, and make use of expensive and highly elaborate equipment, it is often not practical to return a harvesting device, for example, to harvest plants which are missed because the harvester had been misaligned with the cros row.

A device which would automatically center a farm implement with respect to a crop row and which would additionally and automatically maintain the proper height of the implement with respect to the ground level, is greatly to be desired.

BRIEF SUMMARY OF THE INVENTION

The instant invention provides a positioning device for automatically and continuously positioning a farm implement, particularly a tractor-drawn implement such as a sugar beet harvester, in line with planes of a crop row and at the correct height for the implement to do its work.

Although the device of the invention may be used for various types of crops and with various implements such as cultivators and the like, the instant invention will be described with particular reference to a tractor-drawn sugar beet harvester of any of several known designs which dig sugar beets from the ground.

The positioner of the invention comprises a harness which is pivotally connectable to the implement for rotation about an upright axis, and a pair of spaced, elongated sensing shoes for contacting the ground and plants in a crop row therebetween. The shoes are pivotally mounted at their forward or leading ends to the harness by linkage means permitting the shoes to swing up and down, or from side-to-side, or both, with respect to the harness. The linkage means includes means limiting side-to-side swinging of the shoes with respect to the harness to unison swinging toward and away from each other. A spring or other resilient means urges the shoes to swing toward each other for mutual contact with plants in a crop row therebetween.

Implement steering means, which may include a harness-operated value and hydraulic cylinder, responds to rotation of the harness about its upright axis, as may be caused by misalignment of the shoes with a crop row, and steer the implement into realignment with the crop row. Implement raising and lowering means, which may include a shoe-operated hydraulic value and hydraulic cylinder, responds to up and down swinging of the shoes to maintain the correct height of the implement with respect to the ground.

Motion transmitting means are provided to transmit changes in the height of the shoes as they swing up and down to the hydraulic system to raise or lower the harvester with respect to the ground. A level-sensing shoe, hydraulic valve and associated equipment, is clearly shown and described in my U.S. Pat. No. 3,844,357, which is expressly incorporated herein by reference. The motion transmitting means averages the deviations in height of each of the pair of sensing shoes to damp out momentary and insignificant changes in the level of either shoe and to sense primarily only more general deviations in the height of the harvester with respect to the ground as, for example, when an area of softer soil is encountered into which the harvester tires sink more deeply. The pair of sensing shoes, as stated above, move in unison toward or away from each other so that each shoe makes the same angle with an imaginary vertical plane passing between the shoes and through the harness. Since the trailing ends of the shoes are spring-pressed toward each other, both shoes will contact beet plants regardless of the size of the plants, and each plant will intersect the imaginary plane as the plant passes between the shoes,. Momentary misalignment of the harvester with the row of beets causes the harness to pivot about its upright axis. Hydraulic shifting or steering means are then brought to bear to shift the harvester transversely back into alignment with the plant row.

As described, the harvester is automatically maintained in side-to-side alignment with a row of beet plants, and the desired height of the harvester with respect to the ground level is continuously maintained such that the tractor may be steered generally along the crop row without the previously required meticulous attention to the position of the harvester and with rather great tolerance for error, and yet the farmer may be assured that substantially all of the beet plants will be properly harvested.

BRIEF DESCRIPTION OF THE DRAWING

FIG. 1 is a plan view, partially broken away, of a beet harvester pulled by a tractor and equipped with the device of the invention;

FIG. 2 is a broken away, side elevation of the apparatus shown in FIG. 1;

FIG. 3 is an enlarged, broken away, cross-sectional view taken along line 3—3 of FIG. 1 and shown partially in schematic form;

FIG. 4 is a cross-sectional, broken away view taken along line 4—4 of FIG. 3;

FIG. 5 is a broken away view taken along line 5—5 of FIG. 3;

FIG. 6 is a broken away, cross-sectional view taken along line 6—6 of FIG. 3; and FIG. 7 is a view similar to that of FIG. 6 but showing the beet-sensing shoes spread more widely apart.

DETAILED DESCRIPTION OF THE PREFERRED EMBODIMENT

Referring first to FIGS. 1 and 2, there is shown a sugar beet harvester 10 having a generally rectangular frame 12 and supported at the rear with rear tires 10.1. At its forward end, the frame has a rigid, downwardly depending structure 12.1 carrying mounting brackets 12.2 to which are mounted axles 12.3 carrying the beet-digging discs 12.4, all of conventional design. A yoke is pivotally mounted to the frame and extends forwardly thereof, the yoke having side beams 12.5 which are attached pivotally at their rearward ends to the sides of the frame 12 and extend forwardly and downwardly, and a cross beam 12.6 joining the side beams rigidly at their forward ends. The cross beam 12.6 is attached at its midpoint to a draw bar 13.1 of a tractor 13, the draw bar having a bifurcated rearward end providing vertically spaced ears 13.2, 13.3 which pass respectively in sliding contact above and below the flat upper and lower surfaces of the generally rectagular-shaped cross beams 12.6 so as to prevent the cross beam from swinging about a horizontal axis with respect to the draw bar. A vertical pivot pin 13.4, passing through the draw bar and cross beam, permits limited movement of the cross beam with respect to the draw bar about the vertical axis of the pin. At its forward end, the draw bar 13.1 is loosely pinned in conventional fashion to the frame of a tractor, using pin 13.5.

As further shown in FIGS. 1 and 2, the harvester and tractor are pulled through a field of sugar beets, designated generally as 16, and the harvester may have up to four or more pairs of beet-digging discs 12.4 which are separated by the usual distance between rows of sugar beets. It will be assumed that if one of the sets of beet-digging discs 12.4 is accurately aligned with a row of sugar beets, the other sets of discs will similarly be aligned with other rows. As is known, sugar beets are ordinarily topped; that is, the foliage of the beet is removed by cutting, before the beets are picked.

A hydraulic cylinder 18 (FIGS. 1 and 4) is carried in a generally horizontal plane and is pivotally mounted at one end to an ear 13.5 which is mounted to the draw bar at a point spaced forwardly of the pivot pin 13.4. At its other end, the piston of the hydraulic cylinder is pivotally connected to an ear 12.7 mounted to the cross beam 12.6 at a point spaced laterally from the attachment of the cross beam to the draw bar. Lengthening or shortening of the hydraulic cylinder hence causes the cross beam 12.6 of the harvester to swing slightly about the upright pivot pin 13.4, as shown in phantom lines in FIG. 4, thereby steering the harvester slightly to the left or to the right of the direction of travel of the tractor.

A second hydraulic cylinder 20 (FIGS. 1–3) is carried in a generally vertical plane, and is mounted at its forward end to a bracket 20.1 rigidly mounted to the cross beam 12.6 adjacent the attachment of the latter to the draw bar 13.1. The hydraulic cylinder 20 extends rearwardly and upwardly for pivotal attachment to the forward end of a bracket 20.2 which is rigidly mounted to the cross bar 12.8 which forms a part of the harvester frame 12. As shown from the side, as in FIGS. 2 and 3, a triangular suspension is thus provided at the forward end of the harvester and consists of the rigid forward portion of the harvester frame including the bracket 20.2, the side beams 12.5 of the yoke, and the hydraulic cylinder 20. For a given degree of extension of the hydraulic cylinder 20, this triangular suspension is rigid and the beet-digging discs 12.4 of the harvester are effectively supported between the rear harvester wheels 10.1 and the forward end of the draw bar 13.1. If the cylinder 20 is now extended to alter the triangular suspension, the forward end of the harvester will be elevated and the discs 12.4 consequently will be raised, as shown in phantom lines in FIG. 2. Retraction of the hydraulic cylinder 20, in similar fashion, causes the discs 12.4 to be lowered.

Thus, with judicious operation of the hydraulic cylinders 18 and 20, the beet-digging discs 12.4 may be adjusted both vertically and horizontally to maintain vertical and horizontal alignment with a row of sugar beets to be picked. The means for controlling the hydraulic cylinders 18 and 20 will now be described.

A bracket 22 is rigidly carried by the harvester frame, and the bracket is mounted at its rearward end to a cross member 12.9 which is carried beneath the cross beam 12.8, as is shown best in FIG. 3. A vertical bracket 22.1 is rigidly bolted to the forward end of the bracket 22, and has vertically spaced mounting webs 22.2 which in turn are welded to a vertical sleeve 24, the sleeve being spaced forwardly of the cross bar 12.8 of the frame and rearwardly of the cross beam 12.6 of the yoke, as shown best in FIG. 3. A vertical shaft 24.1 is rotatably received in the sleeve 24 and has an upper end provided with a cap 24.2 which is slideable against the upper end of the sleeve 24 and which is attached to the upper end of the shaft by means of a pin or the like. The other end of the shaft extends through the bottom of the sleeve 24 and carries at its lower end a harness 26 (FIGS. 5–7) with a pair of downwardly extending ears 26.1, 26.3 which are spaced transversely of the direction of travel. To the respective ears are mounted transversely outwardly extending shafts 26.3, 26.4. Rotatably mounted on the latter shafts are transversely extending sleeves 26.5, 26.6 which may rotate about a single axis passing through the shafts generally transversely of the direction of travel of the harvester. At their outer ends, the sleeves 26.5, 26.6 are welded to the upper ends of vertical sleeves 26.7, 26.8, and rotatably carried within the last-named sleeves are shoe-mounting shafts 26.9, 27. Bushings 27.1 are securely pinned to the upwardly protruding ends of the shafts 26.9, 27.

Rigidly mounted to the lower protruding ends of the shafts 26.9, 27 are plant and level-sensing shoes 30, 32. From their forward connections with the shafts 26.9, 27, the shoes curve downwardly and then generally rearwardly, as shown best in FIGS. 3 and 6. The shoes have bottom and inner walls providing the shoe with a generally L-shaped cross section with the lower surfaces of the bottom wall contacting the ground and the confronting surfaces of the inner walls contacting a sugar beet plant as will be described more fully below.

Rearwardly extending level arms 34 are attached rigidly at their forward ends to the sleeves 26.7, 26.8, and terminate rearwardly in plates 34.1. The plates are provided with holes through which pass respective generally upright rods 34.2, the lower end of each rod being threaded and provided with a nut restraining the rod from pulling upwardly through the hole in the plate 34.1. Similarly, the upper ends of the respective rods are also threaded, and respectively pass upwardly through the apertured ends of a transverse leveler bar 34.3 (FIGS. 3 and 5), and are held in place with nuts. The nuts on the lower end of the rods 34.2 may be adjusted up or down so that the desired angle of the shoes 30, 32 with the ground may be set. A pair of spaced helical springs 34.6 in tension are mounted between the leveler bar 34.3 and a rearward projection 34.7 mounted to the vertical bracket 22.1 to gently urge the shoes downward into contact with the ground. Sleeves 34.4 are slideably received along the lengths of the upright rods 34.2, and abut the leveler bar at their upper ends. Helical springs 34.5, in compression and of greater strength than the springs 34.6, are provided at the lower end of the rods, and bear against the lower end of the sleeves 34.4 and the upper surfaces of the plates 34.1. Up-and-down rocking motion of the shoes 30,32, or either of them, hence causes the level arms 34 to similarly rock up and down, and this motion will be transmitted through the sleeves 34.4 to the leveler bar 34.3 for a purpose to be subsequently described.

To the bushings or caps 27.1 at the upper ends of the shafts 26.9, 27 are attached rearwardly extending brackets 36, 38 each bracket having a generally transverse leg 36.1, 38.1, the latter legs extending inwardly toward one another. The leg 38.1 terminates inwardly in a generally vertical support plate 38.2 carrying at its end a transversely extending ball 38.3 of a ball-and-socket joint to be described. The other leg 36.1 terminates in an ofesst, generally parallel shaft 36.2 which pivotally mounts a mounting plate 36.3, with the latter pivotable in a generally vertical plane. To an end of the mounting plate 36.3 is mounted a cup-shaped socket 36.4 which is oriented to receive the ball 38.3, as shown best in FIGS. 6 and 7. As will now be understood, as the sensing shoes 30, 32 are pivoted toward and away from one another, the subsequent rotation of the upright shaft 26.9, 27 is imparted to the bracket legs 26.1, 38.1, causing the ball-and-socket joint thus described to move between the positions shown in FIGS. 6 and 7. The pivotal mounting afforded and socket by the shaft 36.2 provides the socket with an extra degree of freedom to prevent binding of the ball therein. The ball-and-socket joint as described thus requires the sensing shoes 32, 30 to always pivot in unison either toward or away from one another, such that the shoes always make equal angles with a plane drawn therebetween and passing through the harness 26.

Extending rearwardly from the bracket legs 38.1, 36.1 and bars 36.4, 38.4 having a series of spaced holes therethrough. A helical spring 40, in tension, urges the shoes 30, 32 toward one another into contact with a beet plant. From the foregoing, it will be understood that by virtue of the ball-and-socket joint thus described, the shoes are constrained to move in unison toward or away from one another, but urged toward one another by the spring 40. It will further be understood that if the shoes 30, 32 are not in perfect alignment with a row of beets to be picked, the harness 26, rather than the individual shoes, will be forced to pivot about its axis with the shoes remaining in contact with the out-of-line row of beets. Rotation of the harness and its upright shaft 24.1 in one direction or another in response to misalignment of the sensing shoes with a row of beet plants, causes the havester to be steered back into correct alignment, as will now be described.

Referring now to FIGS. 3–5, a valve shown generally as 42 is rigidly mounted to the bracket 22.1. The valve may be a four-way valve of known design having inlet and outlet ports 42.1, 42.2 which are connected into the tractor hydraulic system to supply the valve with hydraulic fluid under pressure, and supply and return ports 42.3, 42.4 for supplying hydraulic fluid from the valve to a selected side of a double-acting hydraulic cylinder such as that shown as 18 in FIG. 4. Hydraulic lines, shown schematically as 44, 44.1 lead from the tractor hydraulic system (shown in schematic for as 45 in FIGS. 3 and 4) to the inlet and outlet ports of the valve 42. Supply and return lines 44.2, 44.3 supply hydraulic fluid under pressure from the valve 42 to one or the other of the ports 18.1, 18.2 of the hydraulic cylinder 18. The valve 42 may be a four-way spool-type hydraulic valve such as that manufactured by Cross Manufacturing, Inc. of Lewis, Kansas under the trade name "Converta", and may operate generally under the principle shown in my U.S. Pat. No. 3,844,357. The valve 42 includes a spool or plunger 42.5 which is slideable longitudinally within the valve. Depending upon the position of the plunger in the valve, the valve will supply hydraulic fluid under pressure through line 42.3 or 42.4, or neither, as the case may be. To the outwardly extending end of the plunger 42.5 is pivotally mounted one end of line 42.6 (FIG. 4) the other end of the which link is pivotally mounted to a second line 42.7 which is rigidly attached to the bushing 24.2 pinned to the upper end of the harness shaft 24.1. The link 42.6 serves as a "lost motion" link, and rotation of the shaft 24.1 in one direction or the other will cause the spool or plunger 42.5 to move inwardly or outwardly of the valve 42 to control the flow of hydraulic fluid therefrom. As shown best in FIG. 4, the link 42.6 may be lengthened or shortened, as desired, to adjust the position of the spool in the valve properly in relation to the angular orientation of the shaft 24.1. With reference against to FIG. 4, the valve 42 and its associated linkages are so oriented that when the harness 26 is pivoted in a counterclockwise direction (as when the harvester is slightly misaligned to the left of a row of beets), the valve 42 will supply hydraulic fluid under pressure through the line 44.3, thereby retracting the cylinder 18 and moving the cross beam 12.6 of the yoke into the position shown in phantom lines, thereby steering the harvester to the right so that correct alignment with the row of sugar beets is regained. If the harness 26 is pivoted slightly in a clockwise direction, hydraulic fluid under pressure is supplied through the line 44.2 to the cylinder, causing the harvester to be steered to the left.

In a similar manner, the harvester discs 12.4 may be raised or lowered to maintain their correct height with respect to beet plants. A hydraulic valve 46 (FIGS. 3 and 5) is rigidly attached to the bracket 22.1 which in turn is rigidly attached to the frame of the harvester; the valve 46 being spaced above the leveler bar 34.3. The valve 46 may be similar or identical to the previously desribed four-way valve 42, with inlet and outlet ports 46.1, 46.2 and with supply and return ports 46.3, 46.4. The spool, or plunger 46.5 is in a generally upright position for sliding generally vertically within the valve, the lower end of the spool being joined to the level bar 34.3 approximately midway along the length of the leveler bar. As shown in schematic form in FIG. 3, hydraulic lines 48, 48.1 carry hydraulic system 45 and the inlet and outlet ports 46.1, 46.2 of the valve. Similarly, hydraulic supply lines 48.2, 48.3 carry hydraulic fluid between the valve and the cylinder 20 to cause extension and retraction of the cylinder. If, for example, by virtue of the contour of the ground, the spool or plunger 46.5 is raised upwardly into the valve, hydraulic fluid under pressure will be supplied from the valve through the line 48.3 to the cylinder 20, causing the cylinder to extend and ultimately causing the beet-digging discs to be raised. Similarly, if the spool 46.5 is moved downwardly, the beet-digging discs of the harvester will similarly be lowered.

As is described more fully in my U.S. Pat. No. 3,844,357, the valves 42 and 46 have three basic functional positions. Referring to the valve 42, for example, the spool 42.5 has an intermediate position within the valve in which hydraulic fluid entering the valve through the line 44 is merely recirculated back to the hydraulic system through line 44.1. Movement of the spool toward one end of the valve or the other from its intermediate position causes communication of the high pressure line 44 with one of the cylinder supply lines 44.3, 44.2 with the other of the cylinder supply lines then communicating with the return line 44.1 to the tractor. As is known, valves of this type are very sensitive to even small deviations of the spool from its intermediate position. The further the spool is moved from its intermediate position, the greater the flow rate of hydraulic fluid under pressure through the valve to the cylinder.

In operation, the sensing shoes 30 and 32, and their associated apparatus, are mounted to the frame of the harvester with the rearwardly extending ends of the shoes spaced forwardly only a small distance from the beet-digging discs 12.4 and the flat, rearward portions of the shoes in contact with the ground. The rotational connection between the sleeves 26.5, 26.6 and the shafts 26.3, 26.4 permits the sensing shoes together with the shafts 26.9, 27 to which they are mounted and the sleeves 26.7, 26.8 to pivot about the transverse axis through the shafts 26.3, 26.4, as shown in FIG. 3. The resulting upward and downward movement of the level arms 34 concurrently raises and lowers the sleeves 34.4 on the upright rods 34.2, ultimately raising and lowering the spool 46.5 of the valve 46. The springs 34.5 on the generally upright rods 34.2 act to absorb upward shocks as when the sensing shoes strike and ride over a large rock or the like. As will be understood from FIGS. 5–7, the sensing shoes 30, 32 may move upwardly or downwardly independently of one another, the pivotal mounting of the socket 36.4 on the shaft 36.2 accommodating such uneven movement. The independent upward or downward movement of the sensing shoes is independently transmitted through the sleeves 34.4 to the leveler bar 34.3 to raise or lower the ends of the latter bar, and the resultant up or down motion which is transmitted to the spool 46.5 is, in effect, an average of the upward or downward motions transmitted to the respective ends of the leveler bar. In this manner, the discs 12.4 of the harvester are raised and lowered primarily in response to gross changes in the height of the sensing shoes, rather than momentary level changes effecting one shoe or the other.

As the harvester is pulled through a field, the sensing shoes 30, 32 are seen to be in almost continuous motion as they closely follow the contour of the land and as they alternately converge and diverge in response to sequential contact with sugar beet plants of varying sizes. Since the sensing shoes are spring urged together, the shoes ordinarily both contact each sugar beet plant and accurately position the harness 26 rotationally so as to indicate the deviation in alignment, if any, of the harvester with the row of sugar beets.

Manifestly, I have provided a positioner which automatically maintains the correct horizontal and vertical alignment of a farm implement with a row of plants such as sugar beets. As a result of my invention, the correct horizontal and vertical alignment of a harvester or other implement may be easily maintained without great effort by the tractor operator in maintaining alignment of the tractor with crop rows, and because of the maintenance of alignment as described above, few if any plants are bypassed or missed by the implement.

While I have described a preferred embodiment of the present invention, it should be understood that various changes, adaptations, and modifications may be made therein without departing from the spirit of the invention and the scope of the appended claims.

What is claimed is:

1. A positioner for maintaining the position of an implement such as a sugar beet harvester in correct alignment with the plants of a crop row, and comprising
    a harness pivotable about an upright axis and mountable to an implement;
    a pair of spaced, elongated sensing shoes for contacting plants in a plant row therebetween;
    linkage means pivotally mounting the shoes at their forward ends to the harness for swinging movement of the shoes with respect to the harness, and including means limiting generally horizontal swinging movement of the shoes with respect to the harness to unison movement of the shoes toward and away from each other;
    means resiliently urging the shoes to swing toward each other for mutual contact with successive plants of a crop row therebetween, whereby misalignment of the implement with a crop row causes the harness to rotate about its upright axis; and
    implement steering means responsive to rotation of the harness about its axis to steer the implement into realignment with the crop row.

2. The positioner of claim 1 wherein the linkage means mounts the shoes to the harness for up and down swinging motion in response to changes in the height of the harness with respect to the ground, the positioner including implement raising and lowering means responsive to up and down movement of the shoes to maintain the implement at a predetermined height with respect to the ground.

3. The positioner of claim 2 wherein said linkage means mounts the shoes to the frame for independent vertical swinging movement, and wherein the positioner includes, between the shoes and the raising and lowering means, a motion transmitting linkage responsive to movement of both shoes and transmitting the average motion of the shoes to the raising and lowering means.

4. A positioner for maintaining the correct height of an implement such as a sugar beet harvester with respect to the ground, and comprising
   a harness mountable to the implement;
   a pair of spaced, elongated sensing shoes for contacting the ground on either side of a plant row;
   linkage means pivotally mounting the shoes at their forward ends to the harness for independent swinging up and down movement of the shoes in response to changes in the height of the harness with respect to the ground;
   a motion averaging linkage for averaging the up and down swinging motion of both shoes; and
   implement raising and lowering means responsive to said average movement of the shoes to maintain the implement at a predetermined height with respect to the ground.

5. The positioner of claim 4 wherein said linkage means mounts the sensing shoes to the harness for unison horizontal swinging of the shoes toward or away from each other, and wherein the harness is pivotally mountable to the implement for rotation about an upright axis; the positioner including implement steering means responsive to rotation of the harness upon swinging of the shoes toward one side or the other of the line of travel of the implement, as when the implement is misaligned with a crop row, to steer the implement into realignment with a crop row.

6. A positioner for maintaining the height and the side-to-side position of an implement such as a sugar beet harvester with the plants of a crop row, comprising
   a harness pivotable about an upright axis and mountable to an implement;
   a pair of spaced, elongated sensing shoes for contacting plants in a plant row therebetween;
   linkage means pivotally mounting the shoes at their forward ends to the harness with the shoes extending downwardly and rearwardly for contact with the ground and with plants in a plant row, and including arms extending transversely outwardly from the harness along a single transverse axis and rotatable about said axis, and second arms extending generally downwardly from the first arms and rotatable with respect thereto about generally upright axes and mounting at their bottom ends the shoes, the shoes being swingable from side to side about the upright axes and being swingable up and down about the transverse axis, the respective second arms having a link therebetween to limit movement of the shoes about the upright axes to unison movement toward and away from each other, the second arms having rearwardly extending projections with a helical spring tensioned therebetween to urge the shoes toward one another and into contact with opposed sides of a plant therebetween in a crop row;
   implement steering means responsive to rotation of the harness about its axis to steer the implement into realignment with a crop row;
   an implement raising and lowering means comprising a pair of level arms extending rearwardly from the linkage means and carried rigidly with respect to the transverse arms of the linkage means to raise and lower in response to raising and lowering of the shoes, a leveler bar attached at its ends to the respective level arms, and a plunger-operated hydraulic control valve for controlling the hydraulic raising and lowering of the implement with respect to the ground, the plunger of the valve being attached approximately midway along the length of the leveler bar, whereby the approximate average of the independent upward or downward movement of the shoes is transmitted to the valve plunger to raise or lower the implement;
   whereby misalignment of the implement vertically or to one side or the other of a crop row causes the sensing shoes to swing respectively vertically or horizontally to follow the crop row, which movement of the shoes respectively operates the implement raising and lowering means and the implement steering means to realign the implement with a crop row.

* * * * *